United States Patent
Zhuge

(10) Patent No.: US 10,685,031 B2
(45) Date of Patent: Jun. 16, 2020

(54) DYNAMIC HASH PARTITIONING FOR LARGE-SCALE DATABASE MANAGEMENT SYSTEMS

(71) Applicant: New Relic, Inc., San Francisco, CA (US)

(72) Inventor: Yuke Zhuge, Portland, OR (US)

(73) Assignee: New Relic, Inc., San Francisco, CA (US)

( * ) Notice: Subject to any disclaimer, the term of this patent is extended or adjusted under 35 U.S.C. 154(b) by 282 days.

(21) Appl. No.: 15/937,417

(22) Filed: Mar. 27, 2018

(65) Prior Publication Data

US 2019/0303486 A1 Oct. 3, 2019

(51) Int. Cl.
*G06F 16/25* (2019.01)
*G06F 16/27* (2019.01)

(52) U.S. Cl.
CPC ............ *G06F 16/25* (2019.01); *G06F 16/278* (2019.01)

(58) Field of Classification Search
CPC ............................... G06F 16/25; G06F 16/278
USPC ......................................................... 707/737
See application file for complete search history.

(56) References Cited

U.S. PATENT DOCUMENTS

| | | | | |
|---|---|---|---|---|
| 6,473,774 B1 * | 10/2002 | Cellis | .................. | G06F 16/2282 |
| 6,816,854 B2 * | 11/2004 | Reiner | .............. | G06F 16/24532 |
| | | | | 707/770 |
| 7,200,721 B1 * | 4/2007 | Lang | ...................... | G11C 29/56 |
| | | | | 711/129 |
| 7,908,358 B1 * | 3/2011 | Prasad | ................ | G06F 11/3476 |
| | | | | 709/224 |
| 9,031,994 B1 * | 5/2015 | Cao | ......................... | G06F 16/278 |
| | | | | 707/798 |
| 9,317,343 B1 * | 4/2016 | Willhoit | .............. | G06F 16/2228 |
| 9,317,577 B2 * | 4/2016 | Duan | ................ | G06F 16/24554 |
| 9,323,796 B2 * | 4/2016 | Wen | ........................ | G06F 16/22 |
| 9,563,697 B1 * | 2/2017 | Caplan | ............. | G06F 16/24554 |
| 9,779,117 B1 * | 10/2017 | Guo | ...................... | G06F 16/211 |
| 10,025,943 B1 * | 7/2018 | Multani | .............. | G06F 16/2329 |
| 10,417,251 B2 * | 9/2019 | Willson | ................ | G06F 16/211 |

(Continued)

OTHER PUBLICATIONS

Rajesh, "Different Approaches for Inserting Data Using Dynamic Partitioning into a Partitioned Hive Table", dated Mar. 17, 2016, 5 pages, accessed online at <http://myitlearnings.com/different-approaches-for-inserting-data-using-dynamic-partitioning-into-a-partitioned-hive-table/> on Feb. 20, 2020. (Year: 2016).*

*Primary Examiner* — Phuong Thao Cao
(74) *Attorney, Agent, or Firm* — Fenwick & West LLP

(57) ABSTRACT

A dynamic hash partition management scheme includes associating first partitions of a database with a first partition number, and second partitions of the database with a second partition number, associating first partitions of a database with a first partition number defining a total number of first partitions, and second partitions of the database with a second partition number defining a total number of second partitions. The method further includes, after receiving a request to insert a record in the database, determining an active partition number, and determining the first partition number as an active partition number. The method further includes determining a record key for the record, generating a partition identifier defining a partition of the first partitions using the record key and the active partition number, and inserting the record in the partition defined by the partition identifier.

20 Claims, 10 Drawing Sheets

(56) References Cited

U.S. PATENT DOCUMENTS

| | | | | |
|---|---|---|---|---|
| 10,474,372 B1* | 11/2019 | Olson | | G06F 3/0671 |
| 2007/0027860 A1* | 2/2007 | Bestgen | | G06F 16/24544 |
| 2007/0162506 A1* | 7/2007 | Grosman | | G06F 16/278 |
| 2009/0144346 A1* | 6/2009 | Duffy | | G06F 16/24554 |
| 2009/0171885 A1* | 7/2009 | Silberstein | | G06F 16/278 |
| 2009/0198736 A1* | 8/2009 | Shen | | G06F 16/2282 |
| 2010/0030995 A1* | 2/2010 | Wang | | G06F 16/2282 711/173 |
| 2010/0161569 A1* | 6/2010 | Schreter | | G06F 16/2272 707/696 |
| 2010/0262687 A1* | 10/2010 | Shen | | G06F 16/278 709/224 |
| 2011/0055250 A1* | 3/2011 | Nandy | | G06F 16/248 707/769 |
| 2011/0055290 A1* | 3/2011 | Li | | G06F 16/29 707/807 |
| 2012/0150791 A1* | 6/2012 | Willson | | G06F 16/254 707/600 |
| 2014/0025658 A1* | 1/2014 | Thiyagarajan | | G06F 16/278 707/713 |
| 2014/0365492 A1* | 12/2014 | Wen | | G06F 16/22 707/737 |
| 2015/0032694 A1* | 1/2015 | Rajamani | | G06F 16/2358 707/625 |
| 2016/0026667 A1* | 1/2016 | Mukherjee | | G06F 16/2282 707/714 |
| 2016/0085839 A1* | 3/2016 | D'Halluin | | G06F 16/278 707/747 |
| 2016/0350392 A1* | 12/2016 | Rice | | G06F 16/27 |
| 2016/0371336 A1* | 12/2016 | Dickie | | G06F 16/2456 |
| 2017/0017673 A1* | 1/2017 | Kirk | | G06F 16/24542 |
| 2017/0046342 A1* | 2/2017 | Azgin | | H04L 45/7453 |
| 2017/0140021 A1* | 5/2017 | Gopi | | G06F 16/278 |
| 2017/0163986 A1* | 6/2017 | Jacobson | | H04N 19/137 |
| 2018/0150544 A1* | 5/2018 | Bensberg | | G06F 16/278 |
| 2018/0239808 A1* | 8/2018 | Koochakzadeh | | G06F 16/211 |
| 2019/0171743 A1* | 6/2019 | Ding | | G06F 16/242 |
| 2019/0370268 A1* | 12/2019 | Koochakzadeh | | G06F 16/278 |

* cited by examiner

400

| Partition Identifier | Partition Number | Partition Adress |
|---|---|---|
| 0 | N1 | Address 0 |
| 1 | N1 | Address 1 |
| ... | N1 | ... |
| N1-1 | N1 | ... |

| Partition Identifier | Partition Number | Partition Adress |
|---|---|---|
| 0 | N1 | Address 0 |
| 1 | N1 | Address 1 |
| … | N1 | … |
| N1-1 | N1 | … |
| 0 | N2 | … |
| 1 | N2 | … |
| … | N2 | |
| N2-1 | N2 | --- |

| Partition Identifier | Partition Number | Storage object address |
|---|---|---|
| 0 | N1 | object 1 |
| 0 | N1 | object 2 |
| 0 | N1 | object 3 |
| 1 | N1 | object 4 |
| 1 | N1 | object 5 |
| ... | ... | ... |
| N1 - 1 | N1 | object M |

Storing a partition in multiple storage objects

```
┌─────────────────────────────────────────────────────────┐
│ Associate first partitions of a database with a first   │
│ partition number defining a total number of first       │
│ partitions of a first partition scheme, and second      │
│ partitions of the database with a second partition      │
│ number defining a total number of second                │
│ partitions of a second partition scheme                 │
│                         510                             │
└─────────────────────────────────────────────────────────┘
```

Receive a request to insert a record
in the database

```
┌─────────────────────────────────────────────────────────┐
│ ┌─────────────────────────────────────────────────────┐ │
│ │ Determine an active partition number from the first │ │
│ │              and second partition numbers           │ │
│ │                         520                         │ │
│ └─────────────────────────────────────────────────────┘ │
│                           │                             │
│                           ▼                             │
│ ┌─────────────────────────────────────────────────────┐ │
│ │         Determine a record key of the record        │ │
│ │                         530                         │ │
│ └─────────────────────────────────────────────────────┘ │
│                           │                             │
│                           ▼                             │
│ ┌─────────────────────────────────────────────────────┐ │
│ │ Generate a partition identifier defining a partition│ │
│ │  of the active partition scheme using a query key   │ │
│ │         and the active partition number             │ │
│ │                         540                         │ │
│ └─────────────────────────────────────────────────────┘ │
│                           │                             │
│                           ▼                             │
│ ┌─────────────────────────────────────────────────────┐ │
│ │ Insert the record in the partition using the        │ │
│ │              partition identifier                   │ │
│ │                         550                         │ │
│ └─────────────────────────────────────────────────────┘ │
└─────────────────────────────────────────────────────────┘
```

FIG. 5

DYNAMIC HASH PARTITIONING FOR LARGE-SCALE DATABASE MANAGEMENT SYSTEMS

BACKGROUND

The present invention generally relates to managing data in a database management system, and in particular to, dynamic partitioning of a database.

Hash partitioning is used to handle large-scale data in database management systems. To insert data, a record is provided to one of multiple partitions using a hash key of the record. However, it is difficult to change the number of partitions in a database, especially after some of the partitions have been populated with data. For example, one approach includes moving data in partitions across partition boundaries to conform to a new scheme when the number of partitions change. However, this approach uses the movement of large amounts of data. Another approach includes splitting and merging partitions to respectively increase and decrease the number of partitions. However, this approach involves complicated metadata bookkeeping, and may result in asymmetric partitions.

SUMMARY

Embodiments relate to dynamic hash partition management for databases. Some embodiments include a method for dynamic hash partition management. The method includes associating first partitions of a database with a first partition number defining a total number of first partitions of a first partition scheme, and second partitions of the database with a second partition number defining a total number of second partitions of a second partition scheme. The method further includes, in response to receiving a request to insert a record in the database, determining an active partition number, the first partition number being selected as the active partition number when the first partition scheme is an active partition scheme and the second partition number being selected as the active partition number when the second partition scheme is the active partition scheme. The method further includes determining a record key for the record, generating a partition identifier defining a partition of the database using the record key and the active partition number, and inserting the record in the partition defined by the partition identifier.

In some embodiments, the method includes, in response to a request to retrieve the record, generating a first partition identifier using the record key and the first partition number. The method further includes, generating a second partition identifier using the record key and the second partition number, and retrieving the record from one of a first partition identified by the first partition identifier and a second partition identified by the second partition identifier.

In some embodiments, the method further includes, associating first partition identifiers of the first partitions with the first partition number, and second partition identifiers of the second partitions with a second partition number. The method further includes, retrieving the first partition based on querying the database with the first partition identifier, and retrieving the second partition based on querying the database with the second partition identifier.

In some embodiments, the method includes, associating historical partition identifier and partition number pairs of the database. The method further includes, in response to a request to retrieve the record, generating a hash key by applying a hash function to the record key of the record, determining candidate partitions based on the hash key and the historical partition identifier and partition number pairs, and retrieving the record from at least one partition identified by the candidate partitions.

In some embodiments, the method includes storing the association of the first partitions with the first partition number in a second database. The method further includes, removing a record from a first partition, determining whether the first partition is empty, and in response to determining that the first partition is empty, removing the association of the first partition with the first partition number in the second database.

Some embodiments include a computer program product comprising a non-transitory computer readable storage medium, the non-transitory computer readable storage medium storing instructions that when executed by a processor configures the processor to: associate first partitions of a database with a first partition number defining a total number of first partitions of a first partition scheme, and second partitions of the database with a second partition number defining a total number of second partitions of a second partition scheme, and in response to receiving a request to insert a record in the database, determine an active partition number, the first partition number being selected as the active partition number when the first partition scheme is an active partition scheme and the second partition number being selected as the active partition number when the second partition scheme is the active partition scheme, determine a record key of the record, generate a partition identifier defining a partition of the database using the record key and the active partition number, and insert the record in the partition defined by the partition identifier. Some embodiments include a system for dynamic hash partition management. The system includes processing circuitry configured to: associate first partitions of a database with a first partition number defining a total number of first partitions of a first partition scheme, and second partitions of the database with a second partition number defining a total number of second partitions of a second partition scheme, and in response to receiving a request to insert a record in the database, determine an active partition number, the first partition number being selected as the active partition number when the first partition scheme is an active partition scheme and the second partition number being selected as the active partition number when the second partition scheme is the active partition scheme, determine a record key of the record, generate a partition identifier defining a partition of the database using the record key and the active partition number, and insert the record in the partition defined by the partition identifier.

BRIEF DESCRIPTION OF THE DRAWINGS

FIGS. 4A, 4B, and 4C are tables illustrating metadata for dynamic hash partitioning, according to one embodiment.

FIG. 5 is a flowchart illustrating a process for inserting records into a database with multiple partition schemes, according to one embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments relate to a dynamic hash partitioning for databases storing large volumes of data (big data), such as a database in a multi-tenant system hosted by cloud service providers or other computing system. In such systems, the volume and shape of the data varies greatly from one tenant to another, and can change within one tenant. Manual management of partitioning schemes can be very expensive, both in terms of human resources (e.g., labor) and computing resources (e.g., for data movement or complex metadata management). As such, a dynamic hash partitioning is used to change the number of active partitions in a database, and with little or no data movement for existing data written to the database under a prior partition scheme. For example, the prior partition scheme may include a partition number defining a total number of partitions of the prior scheme, and an active partition scheme may include another partition number defining a total number of partitions in the updated scheme. When a record is to be inserted into the database, an active partition number is selected from the partition numbers of the database. For example, the partition number of the active partition scheme may be selected as the active partition number. The active partition number is used (e.g., in connection with a hash of a record key of the record) to generate a partition identifier for inserting the record into a partition of the active partition scheme. Furthermore, the dynamic harsh partitioning provides for retrieval of records written using the active partition scheme or a prior partition scheme.

Figure 1:
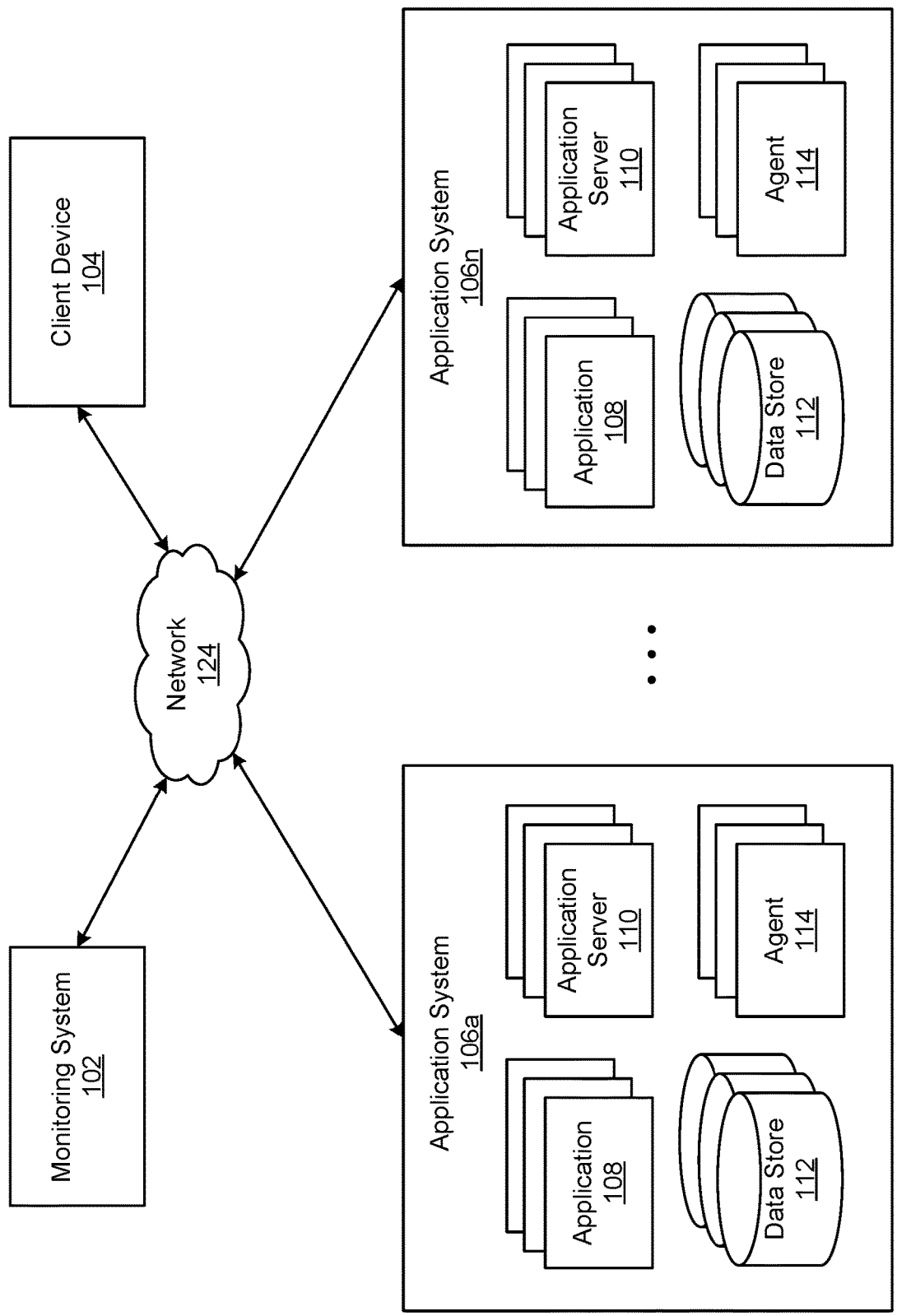
FIG. 1 is a schematic block diagram illustrating a system environment for monitoring application systems, according to one embodiment.

FIG. 1 illustrates a system environment for monitoring application systems, according to one embodiment. The environment includes a monitoring system 102 (discussed in greater detail below with reference to FIG. 2), a client device 104, and application systems 106a-106n (or "application system 106"). The application systems 106a-106n, the monitoring system 102, and the client device 104 may communicate over a network 124, which may include the Internet.

The client device 104 is a device with computing functionality and data communication capabilities capable of receiving user input as well as transmitting and/or receiving data via the network 124. The client device 104 communicates with the application system 106 via the network 124. In various embodiments, the client device 104 may be a wired user device, such as a desktop computer, or a mobile user device, such as a laptop computer, a personal digital assistant (PDA), a mobile telephone, a smartphone, a tablet, or a wearable device. The client device 104 may be used by an operator of the application system 106 and/or the monitoring system 102. For example, the client device 104 may be used by an operator of the monitoring system 102 to receive updates, from the application system 106, concerning the performance of components of the application system 106. Although a single client device 104 is shown in FIG. 1, the environment may include any number of client devices 104.

The application system 106 includes one or more application servers 110 and one or more data stores 112. The data store 112 stores application data for the applications 108 executed by the one or more application servers 110. An application server 110 further executes one or more agents 114 that monitor performance of the application system 106, such as processes running on an application server 110, response time of an application 108, transactions in an application 108, processes of transactions in an application 108, the effect of backend processes on performance of an application 108 at client devices 104, statistics of a virtual machine running an application 108, other information, or a combination thereof. In some embodiments, the application server 110 further executes containers or virtual machines for the applications 108. The agent 114 collects and stores state information relevant to performance of the application 108 or other components (e.g., containers, virtual machines, etc.) of the application system 106. Moreover, the agent 114 may periodically send state information, or other types of information, to the monitoring system 102.

The application 108 may be any of a variety of types of mobile applications or web applications, and may represent a subset of operations of a client-server application. For example, the application 108 operated by the application server 110 may include any server-side processes of a client-server application, such as retrieving and storing database content, generating user interfaces for rendering at the client device 104, performing functions requested at the client device 104, and communicating content to the client device 104 (e.g., over the network 124).

In some embodiments, the application server 110 includes a computing device executing a Java virtual machine that executes processes of the application 108. The virtual machine provides an environment for running the application 108, and manages objects created by the application 108 and a portion of data store 112 (e.g., a memory) used by the application 108. In particular, the virtual machine allocates memory by moving objects, including variables or data structures created during execution of the application 108 and agent 114, between pools of memory to efficiently manage the available memory of the application system 106. The virtual machine also executes garbage collection processes to identify and remove objects no longer used or referenced in the application 108 to free up the memory occupied by the unused objects for storing other objects.

To monitor the application server 110, the monitoring system 102 can provide the agent 114 to the application server 110 (e.g., as a software development kit or as a module integrated into the software of the application 108). While the application server 110 executes the agent 114, the monitoring system 102 communicates with the agent 114 to monitor performance of the application server 110. The monitoring system 102 receives state information of the application 108 from the agent 114. Additionally, the monitoring system 102 generates informational displays (e.g., user interfaces) for analysis, for example, by an administrator of the application server 110, enabling the administrator to address any performance issues in the application 108. For example, the monitoring system 102 generates tables, charts, or plots indicating metrics or event data for processes of the application 108. The informational displays may include statistics from the monitoring system 102 and/or virtual machine running the application 108.

While the environment of FIG. 1 includes a monitoring system 102 just as an example, in alternate examples, the monitoring system 102 may represent another type of database system.

Figure 2:
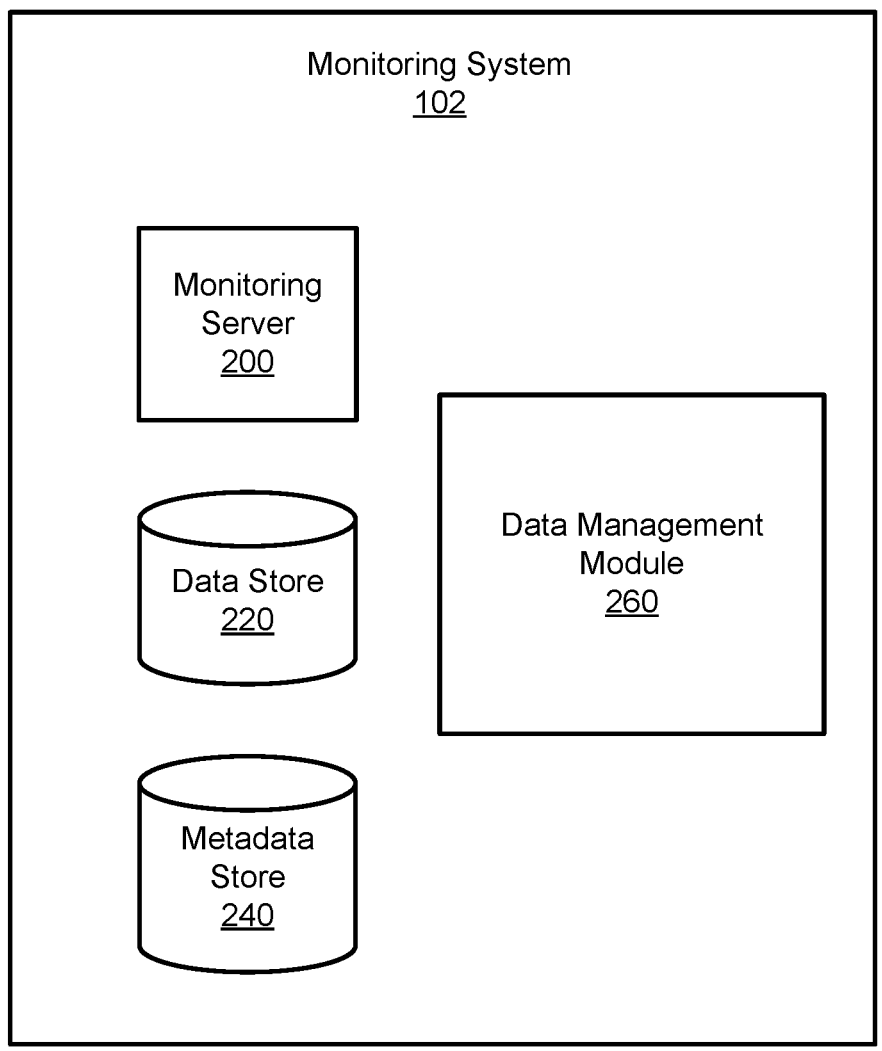
FIG. 2 is a schematic block diagram illustrating a monitoring system that monitors components of an application system, according to one embodiment.

FIG. 2 is a schematic block diagram illustrating a monitoring system 102 that monitors an application system 106, according to one embodiment. The monitoring system 102 includes a monitoring server 200, a data store 220, a metadata store 240, and a data management module 260.

The monitoring server 200 includes processing circuitry (e.g., one or more processors) that monitors performance of the components of the application system 106. While the application system 106 executes the agent 114, the monitoring server 200 communicates with the agent 114 to monitor performance of the application 108 or other components of the application system 106. The monitoring server 200 receives state information from the agent 114 and analyzes the state information to track the performance of the monitored components in the application system 106. The monitoring system 102 uses the data store 220 to store the state information or other data.

The data store 220 stores state information regarding the components of the application system 106, or other types of data. The data store 220 may include a database having one or more partition schemes. Each partition scheme is associated with a partition number defining the number of partitions in the partition scheme. The data store 220 may be a hash partition database where records are inserted to and retrieved from a particular partition based on a partition identifier of the record. The partition identifier for the record may be generated by generating a hash key for the record by applying a hash function to a record key of the record, and performing a modular division of the hash key by a partition number of the (e.g., active) partition scheme using Equation 1:

$$\text{partition ID} = \text{hash(record key)} \% \text{ active partition number} \quad \text{(Eq. 1)}$$

where hash( ) is a hash function, record key is a database instruction or a portion of a database instruction that identifies one or more fields of the record, and the active partition number is the partition number of the current partition scheme. When the data store 220 is changed from a prior partition scheme to a different active partition scheme, new records may be inserted using the partition number of the active partition scheme (or "active partition number," as used herein). To retrieve a record, multiple partition identifiers may be generated using the record key of the record and each partition number associated with the database, and then the partitions associated with the partition identifiers are searched to retrieve the record. In that sense, data that has been written to the data store 220 under the prior partition scheme does not have to be moved in the data store 220 when the active partition scheme changes, but can still be retrieved.

The metadata store 240 stores information about the partitions and partition schemes of the data store to facilitate changing partition schemes. Furthermore, the metadata store 240 may be referenced to facilitate record insertion or retrieval. The metadata store stores a complete list of partitions under each partition scheme of the data store 220 and the metadata associated with each partition. Examples for the metadata includes for each partition a partition identifier that identifies the partition, a partition number defining the total number of partitions to which the partition belongs.

In some embodiments, each partition is associated with a metadata in the format <partition identifier, total number of partitions>. For example, a partition A may be associated with the metadata: <A01, 100> which indicates that partition A is associated with the partition identifier 'A01,' and uses a partition scheme that includes 100 partitions. In some embodiments, the metadata store 240 stores a metadata of a partition in the format: <partition identifier, total number of partitions, partition address>. The partition address in the metadata store 240 identifies the storage location in the data store 220 of the partition. In some embodiments, the partition identifiers may be shared across different partition schemes, and thus each unique partition may be identified via the partition identifier and the partition number.

In some embodiments, each partition may be further associated with one or more storage object addresses that identifies one or more storage objects (e.g., files that store multiple records) that belong to the partition. Here, a partition may be represented by multiple rows in the metadata store 240. Each row represents a storage object of a partition, and multiple storage objects may collectively form a partition. For example, the metadata store 240 stores metadata of the format: <partition identifier, total number of partitions, storage object address>.

The data management module 260 manages the functionality of the data store 220. The data management module 260 performs operations on records including, but not restricted to, insertion of a record, querying for a record, deletion of a record, retrieval of a record, etc. The data management module 260 also performs partition management of the data store 220 including, changing the number of partitions, deleting a partition, combining partitions, etc. The data management module 260 may reference the metadata store 240 to facilitate the partition management of the data store 220. In some embodiments, the data management module 260 inserts and retrieves a record from the data store 220 by generating a partition identifier that identifies one or more partitions that may include the record. The partition identifier may be determined using a record key of the record (e.g., a query or other database instruction) and a partition number by applying a hash function to the record key, and performing a modular division of the hashed record key by the active partition number of the data store 220. In general, each partition scheme of the data store 220 may be associated with a different partition number. As a partition scheme is changed, new records are not allowed into the partitions of the prior partition scheme. Furthermore, the active partition number is changed such that the partition number of the most recent partition scheme that is being used to receive new records is the active partition number. The data management module 260 retrieves the record from one or more partitions using the generated partition identifier.

Insertion of Record

The data management module 260 may determine an initial partition number based on an estimation of data and system properties of the data store 220. When a record is inserted into the data store 220, the data management module 260 inserts the record into a partition using Equation 1:

$$\text{partition ID} = \text{hash(record key)} \% \text{ active partition number} \quad \text{(Eq. 1)}$$

where hash( ) is a hash function, record key is a database instruction or a portion of a database instruction that identifies one or more fields of the record, and the active partition number is the partition number of the current partition scheme.

Figure 3A:
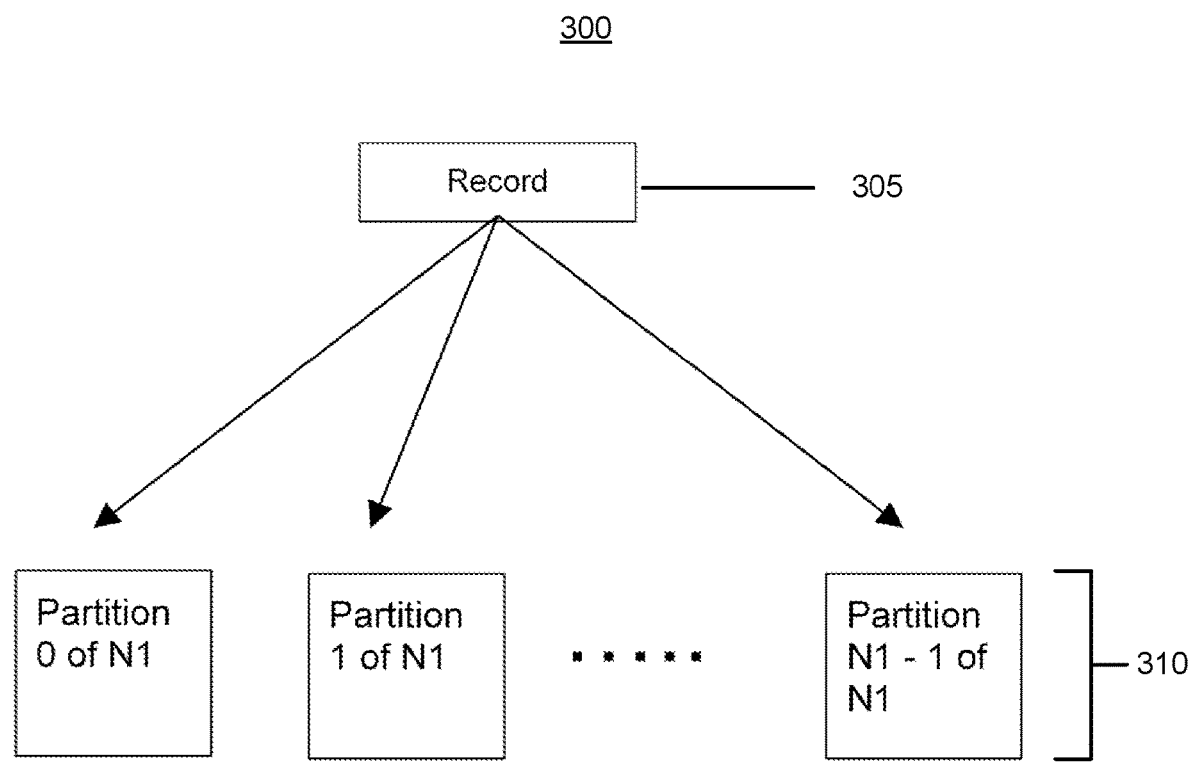
FIGS. 3A and 3B are diagrams illustrating insertion of records with dynamic hash partitioning, according to one embodiment.

FIG. 3A is a diagram 300 illustrating insertion of a record into the data store 220 with a single partition scheme, according to one embodiment. The data store 220 may have a partition scheme 310 with an N1 partition number, including partition 0 through N1-1. A record 305 is inserted into one of the N1 partitions using Equation 1 with N1 as the active partition number.

Per Equation 1, the data management module 260 applies a hash function to the record key of the record to produce a hash value. The data management module 260 computes a partition identifier (partition ID) by performing a modular division of the hash value with the active partition number (e.g., N1 in FIG. 3A). After deriving the partition identifier, the data management module 260 inserts the record to the partition identified by the partition identifier.

In some embodiments, the data management module 260 stores the partition numbers of each partition scheme as part of metadata in the metadata store 240. FIG. 4A is a table 400 illustrating metadata for a single partition scheme, according to one embodiment. The table 400 is an example of a data structure used to store associations of partition IDs and partition numbers, such as within the metadata store 240. Each row of the table 400 represents a unique partition and is identified by the partition identifier. A partition number, such as N1, is associated with each partition to define the number of partitions in the partition scheme to which the partition belongs. In table 400, there is only a single partition scheme of N1 partitions, and thus each partition is associated with the partition number N1. The table 400 further includes the partition address fields, which stores a reference location in the database for the partition. In some embodiments, the metadata store 240 or some other memory may further store the active partition number. To insert a record, the active partition number may be retrieved and used to generate the partition identifier of the partition in which the record is inserted.

Partition Change and Record Insertion

Figure 3B:
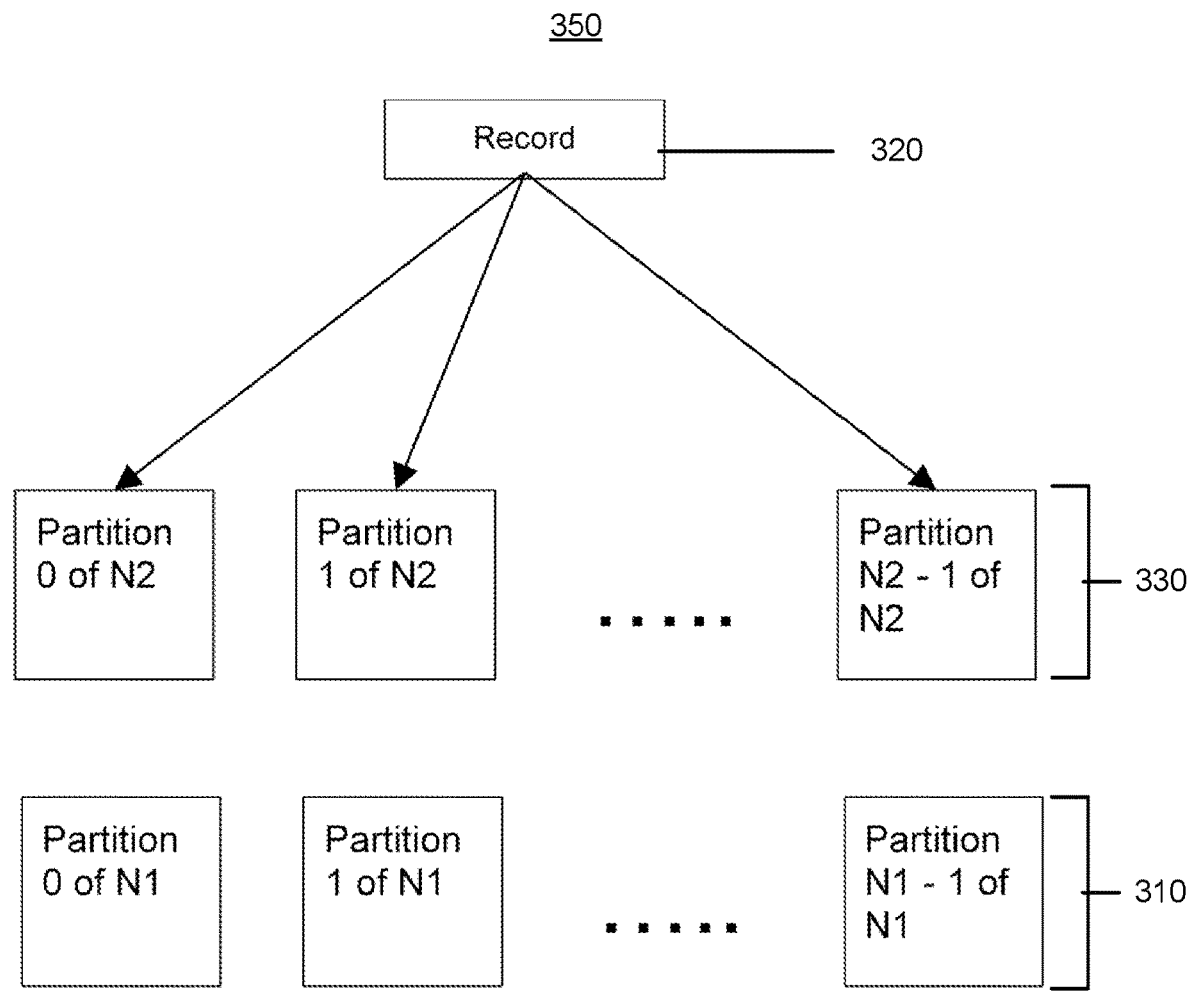

The partition scheme of the data store 220 may be changed after a record has been inserted using a prior partition scheme. In particular, a record may be inserted into a new partition of a new partition scheme using Equation 1 with the partition number of the new partition scheme as the active partition number. FIG. 3B is a diagram 350 illustrating insertion of a record into the data store 220 into an active partition scheme of multiple partition schemes, according to one embodiment. The data store 220 may have a partition scheme 330 with an N2 partition number, including partition 0 through N2-1. A record 320 is inserted into one of the N2 partitions using Equation 1 with N2 as the active partition number. The N1 partitions, such as those including at least one record, may remain in the data store 220. Subsequent to changing data store 220 to the partition scheme 330, additional records are not inserted into the N1 partitions and the N1 partition number is not used as the active partition number for inserting additional records.

To insert a record, Equation 1 may be used to with a new partition number of the new partition scheme as the active partition number. For example, the data management module 260 inserts a first record into a first partition of a database with a first number of partitions (e.g. N1=10 partitions), such as in response to a request to insert the record into the database. The first record may be inserted by calculating the partition identifier of the first partition using Equation 1 with the first number of partitions N1 as the active partition number. After insertion of the first record, the partition scheme is changed from the partition scheme 310 to the partition scheme 330 (e.g., N2=20 partitions). The database management module 260 receives a request to insert a second record in the database. In response to the request, the database management module 260 inserts the second record to the database into a second partition of the database of the active partition scheme 330. The second record may be inserted by calculating the partition identifier of the second partition using Equation 1 with the second number of partitions (e.g., N2=20) as the active partition number. Here, simply by using the active partition number for inserting records, additional records may be inserted into a partition of the data store 220, and there is no need to move data inserted under a prior partition scheme when the partition scheme is changed.

Initially, when there is only a single partition scheme, there is only one partition number. However, if the partition scheme of the data store 220 is changed, then the data store 220 may include partitions of multiple partition numbers. The active partition number may be selected from the multiple partition numbers, such as by selecting the partition number of the current partition scheme used by the data store 220.

FIG. 4B is a table 430 illustrating metadata for multiple partition schemes, according to one embodiment. The table 430 is another example of a data structure used to store associations of partition IDs and partition numbers, such as within the metadata store 240. The table 430 includes rows for partitions of two partition schemes, a first partition scheme having N1 partitions and a second partition scheme having N2 partitions. Although two partition schemes are shown, a database may include one or more partition schemes. Each partition is identified by the partition identifier, is associated with a partition number and partition address.

Querying of Record

Records inserted using the partition schemes of the data store 220 may be retrieved using the data stored in the metadata store 240. As discussed above, the metadata store 240 or some other memory may store associations of partition identifier and partition number, such as shown in the Tables 400 and 430. When the data management module 260 receives a request for a record, the data management module 260 searches the metadata store 240 to identify one or more partitions in which the record may be found, and then searches for the record within the partitions. For example, the data management module 260 performs a query for a record in the metadata store 240 by executing a statement such as "select partitions where partition ID=hash(record key) % partition number," for each partition number of the data store 220. As discussed above, the partition identifiers and partition numbers may be associated fields in the metadata store 240, and thus, the metadata store 240 is referenced to identify partition matches. The search performed by the data management module 260 returns one or more partitions that satisfy the "where" condition in the statement, and the data management module 260 may search the retrieved partitions for the record using the partition addresses of the partitions.

Because the partition scheme and partition numbers of the data store 220 may change, the search performed by the data management module 260 within the metadata store 240 may return a partition that does not contain any records with the record key. For example, when the hash(record key) operation results in a hash value of 55 with metadata store 240 storing partition numbers of 10 and 20, the search performed by the data management module 260 returns partition 5 of the 10 partition scheme and partition 15 of the 20 partition scheme. If the record with this record key is inserted when the active partition scheme was 20, then the record is only in the partition 15 of the 20 partition. The search performed by the data management module 260 returns the partition 5 of the 10 partition scheme as "false positive."

Nonetheless, by reducing the number of partitions that need to be searched to find the record, the data management module 260 reduces the amount of data that must be scanned in the data store 220. For example, with 100 partitions in partition scheme, generating the partition ID of a single partition in the partition scheme means that only 1/100 of the total data in the 100 partitions needs to be scanned.

In some embodiments, the data management module 260 dynamically adjusts the number of partitions to optimize the performance of the monitoring system 102. For example, when the data insertion rate is high, the data management module 260 selects a partition scheme with a larger number of partitions, and when data insertion rate is low, the data management module 260 selects a partition scheme with a small number of partitions. Adjusting the partitions may include changing the active partition number for new record entries, and storing the partition metadata in the metadata store 240 to support queries for records into any of the partitions.

The data management module 260 does not need to redistribute existing records or data to conform to the new partition scheme. Furthermore, the active partition number applies only to data inserted after the partition number has changed. Thus, different partition numbers may be used to insert records at different times. The partition number may be stored in the metadata store 240 to differentiate partitions with the same partition identifier, but different partition numbers. This approach is particularly useful on systems where size and shape of data evolves over time. The active partition number may evolve dynamically to match the partition scheme of the database, and/or to optimize performance.

Partition Search Optimization

The data management module 260 may use various optimizations to improve the querying of records. In some embodiments, the data management module 260 limits the total number of partitions to a small set of numbers. The data management module 260 may increase or decrease the total number of partitions only by a factor of 2, for example. For example, if a first partition scheme has N partitions, then a new partition scheme may be limited to 2*N partitions. As such, a small number of unique numbers will cover a wide range.

Note that, without restriction, the data management module 260 can use any number as a partition number. With a binary restriction, the data management module 260 may choose the partition number from the power of 2 sequence of numbers: i.e. 2, 4, 8, 16, 32, etc. Here, the partition number is limited to a set of numbers that are a power of 2. For a range of 2 to 1024 partitions, an unrestricted data management module 260 may have up to 1023 distinct partition numbers. A binary restricted data management module 260 will have at most 10 distinct partition numbers, because $2^1=2$, $2^{10}=1024$. Fewer distinct numbers will reduce the chance of false positives, as the number of false positives from a metadata search will not exceed the total number of distinct partition numbers. Other forms of restriction may be used, such as by a factor of 4, or 8. In some embodiments, non-exponential growth can also be used, such as on the hundreds, i.e. 100, 200, 300, 400, up to 1000 partitions. Depending on the specific system, the data management module 260 can define restrictions to match system properties.

In some embodiments, the data management module 260 keeps track of historically used partition numbers of the data store 220. During a partition search, the data management module 260 calculates the possible values of partition identifier and partition number pairs that satisfy Equation 1 for the record key of the record. The set of historically used partition numbers may be stored in the metadata store 240 or some other memory.

For example, if the set of partition numbers includes three partition numbers N1, N2, and N3 (e.g., for 3 partition schemes), then the data management module 260 may use Equation 1 to calculate three partitions P1, P2, and P3. The data management module 260 issues queries to the metadata store 240 such as: "where (partition ID=P1 and partition number=N1) OR (partition ID=P2 and partition number=N2) OR (partition ID=P3 and partition number=N3)" to retrieve a list of partitions. In the above example, P1, P2, P3, N1, N2, and N3 are all constants in the query of the metadata store 240. The above optimization enables index scan on the metadata stored in the metadata store 240, assuming the metadata store 240 has index on partition identifier and/or partition number fields. The above optimization also allows the metadata store 240 to make use of indexing to speed up the query. Without this optimization, all its entries in the metadata store 240 are scanned to find rows matching the condition because the metadata store 240 cannot use indexes when both partition ID and partition number are column variables in the query.

Deletion of Record

The data management module 260 also removes records in the data store 220 stored in one or more partitions. In some embodiments, if a partition is empty after a record deletion, the data management module 260 deletes the partition by modifying the metadata stored in the metadata store 240. In particular, the data management module 260 removes the corresponding metadata from the metadata store 240. For example, a row in a table 400 or 430 of the metadata store 240 may be removed to delete the partition. Note that with constant incoming and outgoing data in the monitoring system 102, the deletion of records and partitions may reduce false positives during query, because older partitions using older number of partitions may be removed over time.

Partition Storage Objects

In some embodiments, records are stored in storage objects, where each partition may include one or more storage objects. FIG. 4C is a table 440 illustrating metadata for a partition scheme when records are stored in storage objects, according to one embodiment. The table 440 is another example of a data structure used to store associations of partition IDs and partition numbers, such as within the metadata store 240. The table 440 includes rows corresponding to different storage objects (e.g. object 1, object 2, etc.). Each partition is identified by the partition identifier, a partition number and storage object address.

FIG. 5 is a flowchart illustrating the process 500 for inserting records into a database with multiple partition schemes, according to one embodiment. The process 500 may be performed by the monitoring system 102, such as the data management module 260 in connection with the data store 220 and the metadata store 240. Here, the data being stored as records may include state information regarding monitored components of application systems. Other entities may perform some or all of the steps of the process 500 in other embodiments. For example, processing circuitry (e.g., one or more processors) may perform the process 500 to manage dynamic hash partitions of a database storing other types of records. The process 500 may include different and/or additional steps, and the steps may be in different orders.

The monitoring system 102 associates 510 first partitions of a database with a first partition number defining a total number of first partitions, and second partitions of the database with a second partition number defining a total number of second partitions. The first partitions include partitions of a first partition scheme of the database and the second partitions include partitions of a second partition scheme of the database. The database may be the data store 220. For example, the monitoring system 102 associates N2 number of first partitions with the N2 partition number, and N1 number of second partitions with the N1 partition number by storing these associations in a metadata store 240.

In response to receiving a request to insert a record in the database, the monitoring system 102 determines 520 an active partition number for the database. The monitoring system selects the active partition number from the partition number of the active partition scheme. If the first partition number N2 belongs to the active partition scheme, then the first partitions belong to the active partition scheme, and N2 is selected as the active partition number. Here, N1 is a prior partition number of a prior partition scheme that is closed to receiving new records, and is not selected as the active partition number. In another example, the database may include a single partition scheme and corresponding partition number, which is selected as the active partition number. In some embodiments, the active partition number is stored in the metadata store 240 or some other memory, and is referenced by the data management module 260 to determine the active partition number.

The monitoring system 102 determines 530 a record key of the record. The record key refers to a database instruction or a portion of a database instruction that identifies one or more fields of the record. Each unique record key may reference a particular record in the data store 220. The record key may further include a (e.g., insertion) command, or other information used in generating a query to the data store 220 for the record.

The monitoring system 102 generates 540 a partition identifier defining a partition of the active partition scheme using the record key and the active partition number of the active partition scheme. For example, the data management module 260 applies the record key and the active partition number to Equation 1 to generate the partition identifier.

The monitoring system 102 inserts 550 the record in the partition identified by the partition identifier. For example, the record may be inserted in a file of the partition. In some embodiments, the metadata store 240 stores a partition address of the partition identifier which is used to insert the record into the partition.

The process 500 may be repeated. For example, each time a new record is to be inserted into the database, the active partition number of an active partition scheme may be determined and used to determine the partition of the active partition scheme to insert the record. When the active partition number is changed, such as in connection with a change in the partition scheme of the database, additional records may be inserted using the new active partition number.

Figure 6:
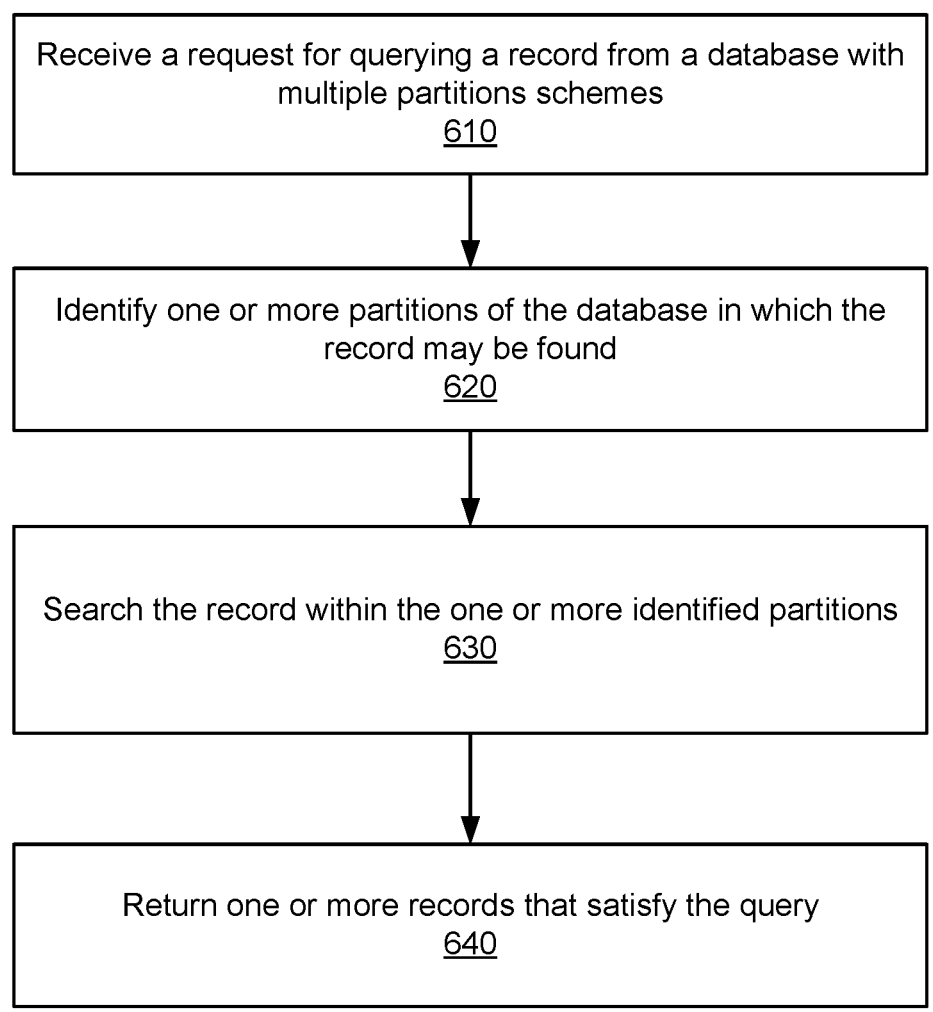
FIG. 6 is a flowchart illustrating a process for querying a record from a database with multiple partition schemes, according to one embodiment.

FIG. 6 is a flowchart illustrating a process 600 for querying a record from a database with multiple partition schemes, according to one embodiment. The process 600 may be performed by the monitoring system 102, such as the data management module 260 in connection with the data store 220 and the metadata store 240. Here, the data being stored as records may include state information regarding monitored components of application systems. Other entities may perform some or all of the steps of the process 600 in other embodiments. For example, processing circuitry (e.g., one or more processors) may perform the process 600 to manage dynamic hash partitions of a database storing other types of records. The process 600 may include different and/or additional steps, and the steps may be in different orders.

The data management module 260 receives 610 a request for a record from a database with multiple partition schemes as discussed above, with reference to FIGS. 3A-B and 4A-C. For example, a first partition scheme may include a first number of partitions, a second partition scheme may include a first number of active partitions, and a second number of inactive partitions, and a third partition scheme may include multiple rows for storing multiple storage objects. The data management module 260 identifies 620 one or more partitions in which the record may be found.

The data management module 260 searches 630 the record within the one or more identified partitions. For example, the data management module 260 performs a query for a record in the metadata store 240 by executing a statement such as "select partitions where partition ID=hash (record key) % partition number," for each partition number of the data store 220.

The data management module 260 may use various optimizations to improve the querying of records from a database with multiple partition schemes. In some embodiments, the data management module 260 limits the total number of partitions to a small set of numbers. In some embodiments, the data management module 260 keeps track of historically used partition numbers of the data store 220. During a partition search, the data management module 260 calculates the possible values of partition identifier and partition number pairs that satisfy Equation 1 for the record key of the record. The above optimization allows the metadata store 240 to make use of indexing to speed up the query.

The search performed by the data management module 260 returns one or more partitions that satisfy the "where" condition in the statement, and the data management module 260 may search the retrieved partitions for the record using the partition addresses of the partitions. The data management module 260 returns one or more records that satisfy the query.

Figure 7:
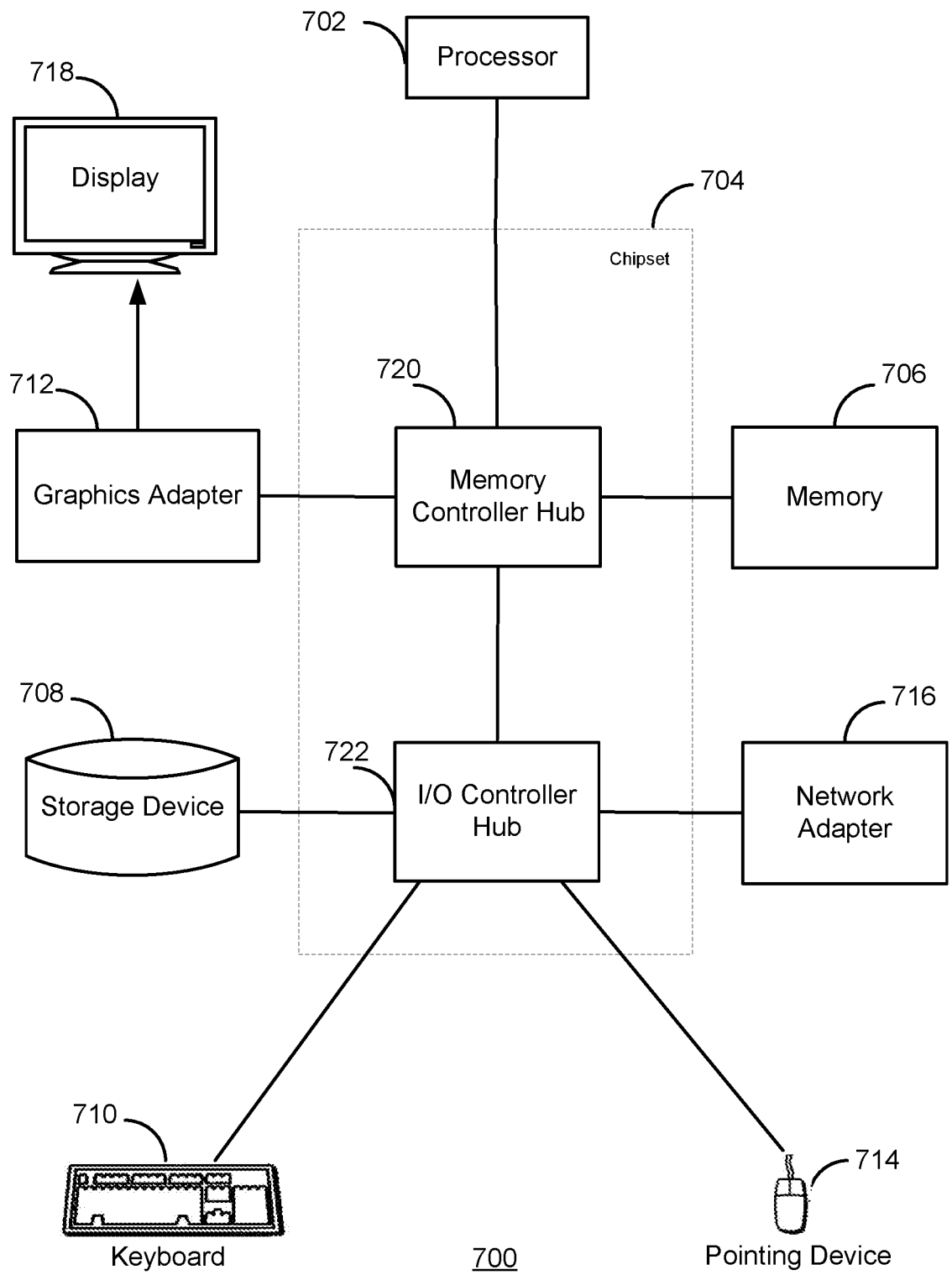
FIG. 7 is a high-level block diagram illustrating an example of a computer, according to one embodiment.

FIG. 7 is a high-level block diagram illustrating an example of a computer 700, according to one embodiment. The computer 700 is an example of circuitry that implements components of the monitoring system 102, client device 104, or application systems 106. Illustrated are at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display device 718 is coupled to the graphics adapter 712. A storage device 708, keyboard 710, pointing device 714, and network adapter 716 are coupled to the I/O controller hub 722. Other embodiments of the computer 700 have different architectures. For example, the memory 706 is directly coupled to the processor 702 in some embodiments.

The storage device 708 includes one or more non-transitory computer-readable storage media such as a hard drive, compact disk read-only memory (CD-ROM), DVD, or a solid-state memory device. The memory 706 holds instructions and data used by the processor 702. The pointing device 714 is used in combination with the keyboard 710 to input data into the computer 700. The graphics adapter 712 displays images and other information on the display device 718. In some embodiments, the display device 718 includes a touch screen capability for receiving user input and selections. The network adapter 716 couples the computer 700 to the network 124. Some embodiments of the computer 700 have different and/or other components than those shown in FIG. 7.

The computer 700 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 708, loaded into the memory 706, and executed by the processor 702.

CONCLUSION

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the disclosure may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the invention.

What is claimed is:

1. A method comprising:
    associating first partitions of a database with a first partition number defining a total number of first partitions of a first partition scheme, and second partitions of the database with a second partition number defining a total number of second partitions of a second partition scheme; and
    in response to receiving a request to insert a record in the database:
        determining an active partition number, the first partition number being selected as the active partition number when the first partition scheme is an active partition scheme and the second partition number being selected as the active partition number when the second partition scheme is the active partition scheme;
        determining a record key of the record;
        generating a partition identifier defining a partition of the database using the record key and the active partition number; and
        inserting the record in the partition defined by the partition identifier.

2. The method of claim 1, further comprising,
    in response to a request to retrieve the record:
        generating a first partition identifier using the record key and the first partition number;
        generating a second partition identifier using the record key and the second partition number; and
        retrieving the record from one of a first partition identified by the first partition identifier and a second partition identified by the second partition identifier.

3. The method of claim 2, further comprising searching for the record in the first partition and the second partition.

4. The method of claim 3, further comprising:
    associating first partition identifiers of the first partitions with the first partition number, and second partition identifiers of the second partitions with the second partition number;
    retrieving the first partition based on querying the database with the first partition identifier; and
    retrieving the second partition based on querying the database with the second partition identifier.

5. The method of claim 1, further comprising:
    determining historical partition identifier and partition number pairs of the database; and
    in response to a request to retrieve the record:
        generating a hash key by applying a hash function to the record key of the record;
        determining candidate partitions based on the hash key and the historical partition identifier and partition number pairs; and retrieving the record from at least one partition identified by the candidate partitions.

6. The method of claim 1, wherein generating the partition identifier using the record key and the active partition number includes:
   generating a hash key by applying a hash function to the record key; and
   performing a modular division of the hash key by the active partition number.

7. The method of claim 1, wherein the first partition scheme is the active partition scheme and the second partition scheme is a prior partition scheme, and wherein at least one record is stored using the prior partition scheme when the record is inserted into the partition.

8. The method of claim 1, wherein the record includes state information for an application, a container, or a virtual machine.

9. The method of claim 1, wherein each of the first partition number and the second partition number is limited to a set of numbers.

10. The method of claim 1, further comprising:
    storing the association of the first partitions with the first partition number in a second database;
    removing a record from a first partition;
    determining whether the first partition is empty; and in response to determining that the first partition is empty, removing the association of the first partition with the first partition number in the second database.

11. A computer program product comprising a non-transitory computer readable storage medium, the non-transitory computer readable storage medium storing instructions that when executed by a processor configures the processor to:
    associate first partitions of a database with a first partition number defining a total number of first partitions of a first partition scheme, and second partitions of the database with a second partition number defining a total number of second partitions of a second partition scheme; and
    in response to receiving a request to insert a record in the database:
        determine an active partition number, the first partition number being selected as the active partition number when the first partition scheme is an active partition scheme and the second partition number being selected as the active partition number when the second partition scheme is the active partition scheme;
        determine a record key of the record;
        generate a partition identifier defining a partition of the database using the record key and the active partition number; and
        insert the record in the partition defined by the partition identifier.

12. The computer program product of claim 11, wherein the instructions when executed by the processor further configures the processor to, in response to a request to retrieve the record:
    generate a first partition identifier using the record key and the first partition number;
    generate a second partition identifier using the record key and the second partition number; and
    retrieve the record from one of a first partition identified by the first partition identifier and a second partition identified by the second partition identifier.

13. The computer program product of claim 12, wherein the instructions when executed by the processor further configures the processor to:
    associate first partition identifiers of the first partitions with the first partition number, and second partition identifiers of the second partitions with a second partition number;
    retrieve the first partition based on querying the database with the first partition identifier; and
    retrieve the second partition based on querying the database with the second partition identifier.

14. The computer program product of claim 11, wherein the instructions when executed by the processor further configures the processor to:
    determine historical partition identifier and partition number pairs of the database; and
    in response to a request to retrieve the record:
        generate a hash key by applying a hash function to the record key of the record;
        determine candidate partitions based on the hash key and the historical partition identifier and partition number pairs; and
        retrieve the record from at least one partition identified by the candidate partitions.

15. The computer program product of claim 11, wherein the first partition scheme is the active partition scheme and the second partition scheme is a prior partition scheme, and wherein at least one record is stored using the prior partition scheme when the record is inserted into the partition.

16. The computer program product of claim 11, wherein the instructions when executed by the processor further configures the processor to:
    generate a hash key by applying a hash function to the record key; and
    perform a modular division of the hash key by the active partition number.

17. The computer program product of claim 11, wherein the record includes state information for an application, a container, or a virtual machine.

18. A system comprising:
    processing circuitry configured to:
        associate first partitions of a database with a first partition number defining a total number of first partitions, and second partitions of the database with a second partition number defining a total number of second partitions; and
        in response to receiving a request to insert a record in the first partitions:
            determine the first partition number as an active partition number, the active partition number selected from the first and second partition numbers of the database;
            determine a record key of the record;
            generate a partition identifier defining a partition of the first partitions using a record key and the active partition number; and
            insert the record in the partition using the partition identifier.

19. The system of claim 18, wherein the processing circuitry is further configured to, in response to a request to retrieve the record:
    generate a first partition identifier using the record key and the first partition number;
    generate a second partition identifier using the record key and the second partition number; and
    retrieve the record from one of a first partition identified by the first partition identifier and a second partition identified by the second partition identifier.

20. The system of claim 19, wherein the instructions when executed by the processor further configures the processor to, in response to the request to retrieve the record:
- associate first partition identifiers of the first partitions with the first partition number, and second partition identifiers of the second partitions with a second partition number;
- retrieve the first partition based on querying the database with the first partition identifier; and
- retrieve the second partition based on querying the database with the second partition identifier.

* * * * *